United States Patent [19]
Whitfield, Jr.

[11] 3,739,590
[45] June 19, 1973

[54] STINGER CONNECTION

[75] Inventor: John H. Whitfield, Jr., Houston, Tex.

[73] Assignee: Esso Production Company, Houston, Tex.

[22] Filed: Sept. 7, 1971

[21] Appl. No.: 177,974

[52] U.S. Cl. .................... 61/72.3, 114/150
[51] Int. Cl. ............... B63b 35/04, F16l 1/00
[58] Field of Search ............ 61/72.3, 72.1, 72.4; 114/150

[56] References Cited
UNITED STATES PATENTS 3,487,648   1/1970   Lawrence ............... 61/72.3
2,657,535  11/1953   Levy ...................... 114/150 X

*Primary Examiner*—Jacob Shapiro
*Attorney*—James A. Reilly, John B. Davidson, Lewis H. Eatherton et al.

[57] ABSTRACT

Apparatus for connecting a pipe discharge ramp or stinger to a lay barge or similar vessel comprises a connecting member mounted on said vessel for pivotal movement in a horizontal plane, means for applying substantially constant force to said connecting member to retard said movement, and means on said connecting member for attaching a stinger to said member for pivotal movement of the stinger in a vertical plane.

9 Claims, 4 Drawing Figures

PATENTED JUN 19 1973 3,739,590
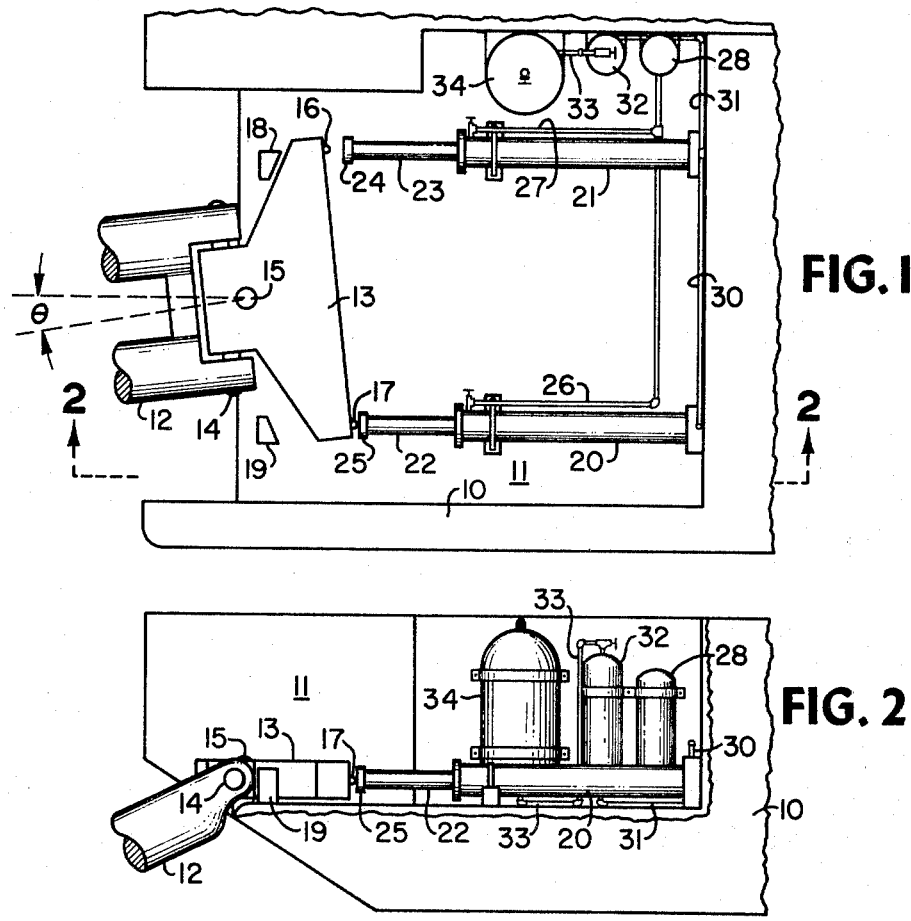
FIG. 1
FIG. 2
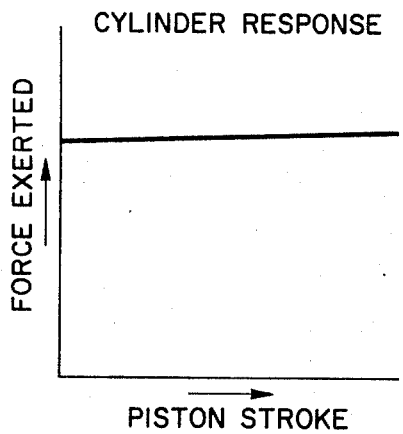
FIG. 3
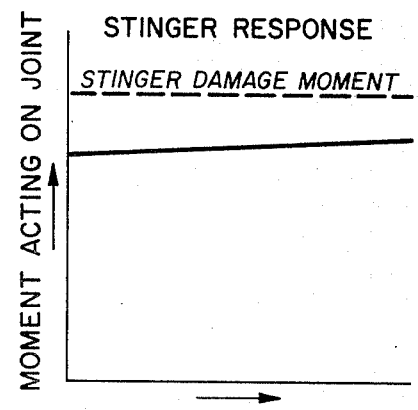
FIG. 4
*INVENTOR.*
*JOHN H. WHITFIELD, JR.*
BY James E. Reed
*ATTORNEY*

STINGER CONNECTION

BACKGROUND OF THE INVENTION

1. Field of the Invention

This invention relates to apparatus for laying underwater pipelines and is particularly concerned with an improved means for connecting a pipe discharge ramp or stinger to the stern of a lay barge or similar vessel.

2. Description of the Prior Art

Underwater pipelines are generally installed by lowering them into place on the ocean floor from the stern of a moving lay barge or similar vessel. As the pipe leaves the vessel, it tends to bend under its own weight and thus assumes a generally S-shaped configuration between the stern of the vessel and the bottom of the body of water. The amount of bending which takes place depends upon the weight and dimensions of the pipe, the depth of the water, the amount of tension maintained in the line, and other factors. Excessive bending will result in kinking or permanent deformation of the pipeline and hence a pipe discharge ramp or stinger which extends into the water behind the barge and supports the pipe is normally used to limit the radius of curvature and prevent permanent deformation. The length and configuration of the stinger are generally such that bending stresses in the supported portion of the pipe are kept below the elastic limit of the pipe material and the bending moments generated are maintained within predetermined bounds. The stinger employed may be either rigid or articulated and may be equipped with floats or similar buoyant members to aid in supporting the pipe. The use of such equipment has permitted the laying of pipelines in considerably deeper water than might otherwise have been feasible.

One of the problems associated with conventional stingers is that of failure of the joint between the stinger and the stern of the lay barge or failure of the stinger near the joint. Such stingers are normally attached to the barge by a hinged joint which is designed to permit vertical motion and thus minimize the stresses generated in the pipeline due to pitch and heave of the lay barge in response to wave action. This has proved satisfactory in calm seas but has not eliminated storm failures. Experience has shown that the stinger and pipe are unable to respond to sudden changes in the direction or angle of yaw of the barge in beam or quartering seas and that the connection between the barge and stinger or the stinger itself is often severely damaged. Although the use of articulated stingers provided with elastically flexible hinge joints that permit movement in both the horizontal and vertical direction has alleviated the problem to some extent, it is still common practice to discontinue operations whenever rough seas are anticipated. This generally involves disconnecting the stinger from the lay barge, lowering the pipe and stinger to the ocean floor, and then picking up and reconnecting the pipe and stinger after the rough weather has subsided. This is time consuming and in some areas may account for a substantial part of the cost of the pipelaying operation.

SUMMARY OF THE INVENTION

The present invention provides an improved system for the connection of a pipe ramp or stinger to a lay barge or similar vessel which at least in part overcomes the difficulties outlined above. This improved connection includes a connecting member or yoke mounted on the vessel for pivotal motion in a horizontal plane, means for applying substantially constant force to the connecting member in a direction which will resist motion in the horizontal plane, and means on the connecting member for attaching a stinger to permit pivotal motion of the stinger in a vertical plane. The system employed thus permits the stinger to move vertically as the vessel rises and falls in response to wave action but resists movement in the horizontal plane until the forces acting on the stinger due to motion of the vessel are sufficient to overcome the force applied to the connecting member. The magnitude of this applied force is such that the vessel and stinger will behave as though they were rigidly connected to one another as long as the forces acting on the stinger due to vessel motion remain relatively low. This simplifies control of the stinger during pipelaying operations and has pronounced advantages over a system in which the stinger is free to move horizontally in response to vessel motion. When the forces acting on the stinger become sufficiently large to exceed the substantially constant applied force, relative motion between the stinger and vessel in the horizontal plane takes place so that failure at the point where the stinger is connected to the vessel is avoided. This makes it possible for the vessel to ride out rough seas that might otherwise require that the stinger be disconnected and lowered to the ocean floor until the rough weather has subsided.

BRIEF DESCRIPTION OF THE DRAWINGS

FIG. 1 in the drawing is a plan view of the stern of a lay barge to which a stinger is attached in accordance with the invention;

FIG. 2 is an elevation view of the barge and stinger shown in FIG. 1;

FIG. 3 is a graph depicting the response of the constant force units employed in the apparatus of FIGS. 1 and 2; and FIG. 4 is a graph representing the response of the stinger of FIGS. 1 and 2 as the moment acting on the connection between the vessel and stinger increases.

DESCRIPTION OF THE PREFERRED EMBODIMENTS

FIG. 1 in the drawing is a fragmentary top view of the stern of a lay barge or similar vessel equipped with the apparatus of the invention. The barge hull 10 contains a recessed area 11 near the stern within which the apparatus employed to connect stinger 12 to the barge is mounted. This recessed area is normally located on the starboard side of the barge as shown but if desired may be provided at a different location. The stinger, only a portion of which is shown in the drawing, may be of conventional design. It extends astern of the barge and may be either rigid or articulated. If an articulated stinger is employed, the sections may, if desired, be hinged both horizontally and vertically. The pipe supports on the barge deck and the rollers or similar members used to support the pipe as it moves down the stinger are not shown in the drawing.

The apparatus by means of which the stinger is connected to the barge includes a yoke or connecting member 13 to which the stinger is hinged for movement in the vertical plane about horizontal hinge pin 14 in response to wave motion and forces exerted by the pipe as it moves down the stinger. The connecting member shown is of a generally T-shaped configuration but, as pointed out hereafter, other configurations may be employed. This member is mounted on vertical hinge pin or shaft 15 for pivotal movement in the horizontal plane. Projections or bearing surfaces 16 and 17 are located on the connecting member near the outer ends thereof to permit the continued application of force to one of the projections as the member moves about pin 15. Stops 18 and 19, welded or otherwise secured to the deck in front of the connecting member, limit the angular displacement of the connecting member.

Constant force units 20 and 21 are fixed to the deck of the barge forward of the connecting member 13. Each of the two units shown include an outer cylinder and an internal piston. Piston rods 22 and 23 extend from the cylinders through suitable packing glands and are provided at their outer ends with bearing surfaces 24 and 25 which abut against projections 16 and 17 on the connecting member when the member is in the normal operating position and the angle $\theta$ is thus zero. The constant force units are positioned so that the piston rods are fully extended when the stinger is in the normal position. Any rotation of the connecting member in either direction about hinge pin 15 will be resisted by the force applied by the constant force unit toward which the member tends to move. The connecting member will thus tend to behave as though it were rigidly mounted until such time as the deflecting forces exceed those applied by the constant force units. Thereafter, movement in the horizontal plane will occur.

Lines 26 and 27 extend from openings in the cylinder walls near the ends from which the piston rods extend to a low pressure reservoir 28 mounted in a vertical position near the stern of the barge. The lower portion of this reservoir and the lines extending back to the cylinders contain an oil under low pressure. The upper part of the reservoir above the oil surface is filled with low pressure air, nitrogen, or other gas. Lines 30 and 31 extend from the opposite ends of the cylinders to the lower end of oil reservoir 32. This reservoir is partially filled with oil under high pressure. The upper portion of the oil reservoir contains high pressure air, nitrogen, or the like which is admitted through line 33 from the bottom of air or gas reservoir 34. Air or gas is thus employed to actuate the pistons in cylinders 20 and 21 and provide essentially constant forces on connecting member 13. The magnitude of these forces is determined by the air or gas pressure in reservoir 34. The applied force is an essentially linear function of the pressure in the reservoir and can thus be controlled at substantially any level desired. As indicated in FIG. 3 of the drawing, the force exerted by units of this type remains substantially constant, regardless of the position of the piston. Such devices have been widely used for the application of tension to risers and guidelines on offshore drilling vessels and will therefore be familiar to those skilled in the art.

The force to be applied to connecting member 13 by pistons 22 and 23 will depend primarily upon the mechanical characteristics of the stinger employed. The applied force should be selected so that the pistons will resist forces tending to rotate the stinger with respect to the barge until the moment acting on the joint approaches that at which damage to the joint is apt to occur. At this point, the force opposing one of the pistons becomes sufficiently large to overcome the force exerted by that piston and the stinger is deflected through an angle $\theta$. As indicated in FIG. 4, the deflection angle increases with an increase in the moment acting on the joint after the initial threshold has been reached. This provides a measure of safety not obtained with other stinger connecting systems. As long as the forces acting on the stinger remain relatively low, the stinger connection behaves as an essentially rigid connection with little or no rotation in the horizontal plane. This permits much better control than can normally be obtained with a connection that is free to rotate horizontally. After the forces reach a predetermined level, rotation occurs to prevent stinger failure at or near the joint. By thus permitting limited rotation, many failures that would occur with a joint of conventional design can be avoided. In very high seas it may still be necessary to disconnect the stinger to avoid failure but the system described herein will normally permit operation under more adverse conditions than would otherwise be possible.

It will be understood that the apparatus of the invention is not restricted to the particular equipment shown and that other connecting members and devices for applying substantially constant force to resist horizontal rotation of the stinger may be used. In lieu of the T-shaped connecting member shown, for example, an elongated connecting member with constant force units in opposed positions near its forward end may be employed. In place of the hydraulic units depicted in the drawing, mechanical systems using weights and cables, magnetic devices, or other systems for applying the substantially constant force needed can be employed. These and similar modifications of the system shown in the drawing will be readily apparent to those skilled in the art.

I claim:

1. Apparatus for connecting a pipe discharge ramp to a vessel from which a pipeline is to be lowered on said ramp during offshore pipelaying operations which comprises a connecting member mounted on said vessel for pivotal movement in a horizontal plane, a hydraulic cylinder for applying substantially constant force of controlled magnitude to said connecting member to retard said movement, and means on said connecting member for attaching said pipe ramp to said member to permit pivotal movement of the ramp in a vertical plane.

2. Apparatus as defined by claim 1 wherein said connecting member is a generally T-shaped member positioned on a vertical shaft.

3. Apparatus as defined by claim 1 wherein said means for attaching said pipe ramp to said connecting member comprises a horizontal hinge pin.

4. Apparatus as defined by claim 1 including a pair of hydraulic cylinders fitted with pistons which bear against said connecting member when the pistons are fully extended and the connecting member is in the normal operating position.

5. Apparatus as defined by claim 4 wherein said hydraulic cylinders are connected to a high pressure gas source.

6. Apparatus for connecting a pipe ramp to the stern of a lay barge or similar vessel for use in offshore pipelaying operations which comprises a connecting member positioned in a vertical shaft near the stern of said vessel for pivotal motion in a horizontal plane; means on said connecting member astern of said shaft for attaching said pipe ramp to said member for pivotal motion in a vertical plane; and means for applying substantially constant forces of controlled magnitude to said connecting member to generate clockwise and counterclockwise moments about said vertical shaft.

7. Apparatus as defined by claim 6 wherein said means for applying said substantially constant forces to said bearing surfaces comprises a pair of hydraulic cylinders, each of said cylinders containing a piston fitted with a rod which bears against said connecting member when said rods are fully extended and said member is in its normal operating position.

8. Apparatus as defined by claim 7 including a high pressure gas source and an intermediate oil reservoir for actuating said pistons.

9. Apparatus as defined by claim 8 wherein said high pressure gas source comprises a compressed air reservoir.

* * * * *